United States Patent
Chaut et al.

(10) Patent No.: US 11,869,471 B2
(45) Date of Patent: Jan. 9, 2024

(54) COMPOSITE SANDWICH PANEL COMPRISING HONEYCOMB CORE AND LAYER OF DAMPING OR ATTENUATION MATERIAL

(71) Applicant: Zephyros, Inc., Romeo, MI (US)

(72) Inventors: Christophe Chaut, Molsheim (FR); Jerome Matrat, Molsheim (FR); Laura Sivec, Romeo, MI (US)

(73) Assignee: Zephyros, Inc., Romeo, MI (US)

( * ) Notice: Subject to any disclaimer, the term of this patent is extended or adjusted under 35 U.S.C. 154(b) by 8 days.

(21) Appl. No.: 16/493,639

(22) PCT Filed: Mar. 13, 2018

(86) PCT No.: PCT/EP2018/056244
§ 371 (c)(1),
(2) Date: Sep. 12, 2019

(87) PCT Pub. No.: WO2018/167062
PCT Pub. Date: Sep. 20, 2018

(65) Prior Publication Data
US 2020/0005755 A1    Jan. 2, 2020

(30) Foreign Application Priority Data

Mar. 13, 2017  (EP) ..................................... 17160699
Jul. 12, 2017  (EP) ..................................... 17180865

(51) Int. Cl.
B32B 3/12      (2006.01)
G10K 11/165    (2006.01)
(Continued)

(52) U.S. Cl.
CPC ....... *G10K 11/165* (2013.01); *B01J 20/28026* (2013.01); *B32B 3/12* (2013.01);
(Continued)

(58) Field of Classification Search
CPC ............................... B32B 3/12; B32B 3/2307
See application file for complete search history.

(56) References Cited

U.S. PATENT DOCUMENTS 3,647,751 A    3/1972  Darsow
4,175,175 A    11/1979 Johnson et al.
(Continued)

FOREIGN PATENT DOCUMENTS

CN    106847253 A    6/2017
EP    0936377 A2     8/1999
(Continued)

OTHER PUBLICATIONS

English language translation of Jp 2007-230130A generated on Aug. 2, 2021 with Espacenet website (https://www.epo.org/searching-for-patents/technical/espacenet.html).*
(Continued)

*Primary Examiner* — Mark Ruthkosky
*Assistant Examiner* — Julia L Rummel
(74) *Attorney, Agent, or Firm* — The Dobrusin Law Firm, PC (57) ABSTRACT

The invention relates generally to a panel structure that incorporates one or more panels and a material for providing reinforcement, baffling, sealing, sound absorption, damping or attenuation, thermal insulation, combinations thereof or the like.

8 Claims, 4 Drawing Sheets

7.7 g; max height: 5.9 mm
Cell size 3.2 mm / ~0.5mm coating 7.7 g; thickness: 3.2 mm (51) Int. Cl.
*B01J 20/28* (2006.01)
*B32B 15/08* (2006.01)

(52) U.S. Cl.
CPC .......... *B32B 15/08* (2013.01); *B32B 2255/26* (2013.01); *B32B 2307/56* (2013.01)

(56) References Cited

U.S. PATENT DOCUMENTS

| | | | |
|---|---|---|---|
| 5,084,532 A | 1/1992 | Schenkel | |
| 5,275,853 A | 1/1994 | Silvis et al. | |
| 5,464,924 A | 11/1995 | Silvis et al. | |
| 5,605,745 A | 2/1997 | Recker et al. | |
| 5,686,509 A | 11/1997 | Nakaama et al. | |
| 5,962,093 A | 10/1999 | White et al. | |
| 6,015,865 A | 1/2000 | Blank et al. | |
| 8,070,994 B2 | 12/2011 | Carlson et al. | |
| 2003/0041733 A1 | 3/2003 | Seguin | |
| 2004/0204551 A1 | 10/2004 | Czaplicki et al. | |
| 2004/0253407 A1* | 12/2004 | Shah ......................... B32B 7/12 428/117 |
| 2007/0101679 A1* | 5/2007 | Harthcock ........... B62D 29/002 52/782.1 |
| 2008/0182067 A1* | 7/2008 | Shen ..................... B32B 37/146 521/50 |
| 2012/0153242 A1* | 6/2012 | Le Bonte .................. B32B 5/20 252/606 |
| 2015/0099851 A1* | 4/2015 | Pinto ..................... C08F 216/10 526/313 |
| 2015/0190981 A1 | 7/2015 | Levit et al. | |
| 2016/0243733 A1* | 8/2016 | Meyer ..................... B32B 27/20 |
| 2018/0022056 A1 | 1/2018 | Shen et al. | |

FOREIGN PATENT DOCUMENTS

| | | |
|---|---|---|
| EP | 1789250 A2 | 5/2007 |
| EP | 2363277 A1 | 9/2011 |
| EP | 2953130 A1 | 12/2015 |
| JP | H0257329 A | 2/1990 |
| JP | 2001096558 A | 4/2001 |
| JP | 2007230130 A | 9/2007 |
| WO | 2010/149353 A1 | 12/2010 |
| WO | 2010/149354 A1 | 12/2010 |

OTHER PUBLICATIONS

Eastman, "Plastolyn(tm) Hydrocarbon Resins", 2013, p. 1-2; Accessed at https://web.archive.org/web/20130603082612/https://www.eastman.com/Brands/Plastolyn/Pages/Overview.aspx.*

PCT Search Report & Written Opinion dated May 14, 2018, Application No. PCT/EP2018/056244.

* cited by examiner

7.7 g; max height: 5.9 mm
Cell size 3.2 mm / ~0.5mm coating 7.7 g; thickness: 3.2 mm

COMPOSITE SANDWICH PANEL COMPRISING HONEYCOMB CORE AND LAYER OF DAMPING OR ATTENUATION MATERIAL

FIELD OF THE INVENTION

The invention relates generally to a panel structure that incorporates one or more panels and a material for providing reinforcement, baffling, sealing, sound absorption, damping or attenuation, thermal insulation, combinations thereof or the like.

BACKGROUND OF THE INVENTION

Sandwich panels comprising honeycomb structures with one or two facing panels are well known and have widespread use to provide high strength, particularly strength and modulus at light weight. The honeycombs themselves may be made of any suitable materials such as metals such as aluminum or resin impregnated papers such as the Nomex materials available from the Hexcel Corporation.

For many years, industry, and particularly the transportation industry, has been concerned with designing innovative structures that assist in providing functional attributes such as reinforcement, baffling, sealing, sound absorption, damping or attenuation, thermal insulation, combinations thereof or the like to articles of manufacture such as airplanes, automotive vehicles, buildings, furniture or the like. In the interest of continuing such innovation, the present invention provides a panel structure having one or more desirable functional attributes.

Several panel structures of the prior art are provided with a material for providing sound absorption, damping or attenuation, wherein the material is applied in the form of a sheet or layer on the outside of the panel. In a typical conventional construction of this type, a honeycomb structure comprising a honeycomb core between two face sheets is provided on the outer surface of at least one of the face sheets with a material for providing sound absorption, damping or attenuation, typically with a polymer composition having the appropriate properties. It can be desirable to apply the material for providing sound absorption, damping or attenuation only to a specific area of the panel structure, e.g. in order to achieve sound absorption, damping or attenuation only at specific predetermined locations thereby minimizing material consumption and overall weight of the panel structure.

Attempts have been made to integrate the material for providing sound absorption, damping or attenuation in the inside of the panel structure, i.e. between the two face sheets such that the material for providing sound absorption, damping or attenuation is not visible from the outside. Such structures inter alia have the advantage of a smaller volume.

CN 106847253 discloses a honeycomb cavity structure acoustic covering layer. The honeycomb cavity structure acoustic covering layer comprises a damping layer. The damping layer is internally provided with periodically and horizontally distributed honeycomb cavities, and comprises a rubber layer or a high-molecular resin layer, and the center line of the honeycomb cavities is perpendicular to the elastic wave or sound wave propagation direction.

EP 0 936 377 relates to a method of making a sacrificial energy absorbing structure, e.g. crash padding, comprising the steps of providing a deformable cellular matrix of the kind comprising a plurality of open-ended tubular cells, coating the walls of the tubular cells with a flexible material and allowing the coating to cure.

EP 1 789 250 discloses a panel structure and a method of forming the panel structure. The panel structure typically includes at least one panel associated with a material.

EP 2 363 277 relates to a panel structure for providing sound absorption, damping or attenuation comprising a first panel and a second panel with a material disposed there between wherein the first and second panels are formed at least partially of a plastic material; the material comprises a support structure together with a sound absorption damping or attenuation structure wherein the support structure is a honeycomb extending between the first and second panels and the sound absorption damping or a attenuation structure is a foam disposed within the cells of the honeycomb, the panels are especially useful of aircraft interior.

EP 2 953 130 discloses a n aircraft engine assembly comprising a nacelle configured to surround the aircraft engine having an inlet open to ambient air and an annular acoustic panel provided within the nacelle. Sound emitted from the aircraft engine is attenuated by the annular acoustic panel. The annular acoustic panel comprises an open framework, made from a first material, forming a plurality of cells. EP 2 953 130 relates to a Helmholtz resonator, i.e. a methodology to absorb sound through a cavity (the depth of the cavity being tuned to the frequency range of interest). Hence, this methodology requires the face sheets of the sandwich structure to be perforated.

WO 2010/149353 discloses laminar structures comprising two facing panels separated by a honeycomb structure containing foamed elastomeric material in the cells that provide a combination of sound insulation and fire retardancy in a compact light weight foam which can be produced using traditional manufacturing techniques.

WO 2010/149354 relates to foamable elastomeric formulations that are suitable for producing polymer foams with insulation and vibration damping properties and the fire retardancy required for internal aircraft panels.

JP 2001 096558 provides a composite material capable of enhancing a specific strength per weight and a specific strength per material cost at once and a method for manufacturing it. A plastic wall b of the same type as or different type from a foamed plastic is formed between adjacent foamed plastic particles a, and a connecting strength between the adjacent particles a is enhanced by the wall b. In the composite material, the particles a are used as forms, and the wall b is build in a stereoscopic mesh-like state. Accordingly, a shape of the wall b becomes a honeycomb-like state (actually in a non-fixed form) as shown in Figure even by cutting at any section, thereby realizing a very rigid structure.

JP 2007 230130 provides a honeycomb sound-absorption laminate structure employing a compound foam sheet which is produced by imparting stiffness to a foam material made of a soft thermoplastic resin having high sound-absorbing performance but poor stiffness and is available as a sound absorption material for e.g. various industrial materials. The sound absorption laminate structure is a laminate consisting of a compound foam sheet 1 in which cells of a honeycomb-structured core made of foam of a thermoplastic resin (A) are filled with foam of another thermoplastic resin (B) and a sheet which has a large number of pores and is laminated on the compound foam sheet.

JP H02 57329 (JP 1988 0208940) relates to improving heat insulation, flame resistance and shape retentivity by filling inorganic foamable particles mixed with aqueous sodium silicate solution in the hollow part of a honeycomb-like inorganic sheet core made by coating a raw sheet containing as a main material aluminum hydroxide with the sodium silicate, and applying a metal plate or glass wool to the face thereof.

US 2003/0041733 discloses an adsorbent article having a base body or matrix onto which is applied an adsorptive coating. The body or matrix can be a honeycomb matrix or structure having a plurality of cells defining a plurality of passages extending through the body. The adsorptive coating comprises an adsorptive media, such as activated carbon or ion exchange resin, that is bound by a polymeric adhesive or resin.

The panels of the prior art are however not satisfactory in every respect and there is a demand for improved panels. It would be desirable to integrate the material for providing sound absorption, damping or attenuation in the inside of the panel structure without the need of a foamable material that upon curing, reacting, activating and/or melting essentially fills the columnar cells.

It is therefore an object of the invention to provide panels that have advantages compared to the panels of the prior art. The panels should be advantageously useful and provide reinforcement, baffling, sealing, sound absorption, damping or attenuation, thermal insulation, combinations thereof or the like. Further, the panels should meet relevant fire resistance requirements and assure equivalent mechanical properties of the sandwich panel (compared to conventional empty honeycomb core assembly). Still further, the panels should be easy to manufacture and it should be possible to provide reinforcement, baffling, sealing, sound absorption, damping or attenuation, thermal insulation, combinations thereof only locally, i.e. not necessarily over the whole area of the panels.

This object has been achieved by the subject-matter of the patent claims.

It has been surprisingly found that the composite loss factor to weight ratio of honeycomb cores can be maximized thereby further improving acoustic performance of sandwich panels. Further, it has been surprisingly found that sound damping or sound attenuation materials can be seamlessly integrated within current composite part manufacturing processes.

SUMMARY OF THE INVENTION

A first aspect of the invention relates to a reinforcement element comprising cell walls forming an array of hollow columnar cells, wherein each columnar cell comprises a cavity which is surrounded by cell walls, and wherein the reinforcement element comprises at least one coated columnar cell comprising a cavity which is surrounded by cell walls, wherein an inner surface of a cell wall towards the cavity of the at least one coated columnar cell is at least partially covered with a layer of a damping or attenuation material.

For the purpose of the specification, the term "damping or attenuation material" preferably refers to any material that is suitable to provide sound damping or sound attenuation. A skilled person recognizes that such material may additionally provide other properties such as sound absorption, reinforcement, and the like.

Preferably, the hollow columnar cells comprise hollow cavities each having a volume of at least about 3.0 mm$^3$, more preferably at least about 20 mm$^3$, yet more preferably at least about 50 mm$^3$. Thus, in contrast to the panels known from e.g. EP 1 789 250, EP 2 363 277, WO 2010/149353, and WO 2010/149354, the panels according to the invention do not comprise columnar cells that are filled with foam, but columnar cells that contain voids, and most preferably remain hollow.

Typically, the damping or attenuation material provides reinforcement, baffling, sealing, sound absorption, damping, attenuation, thermal insulation, combinations thereof or the like to the reinforcement element and/or panel structure and/or an article of manufacture incorporating the reinforcement element and panel structure, respectively. In one particular embodiment, the damping or attenuation material does not provide significant reinforcement. In one particular embodiment, the panel structure is particularly useful when employed for interior portions of transportation vehicles and particularly aerospace vehicles such as airplanes.

Once vibrational energy has been collected, it should be dissipated. According to the present invention this can be assured by a damping or attenuation material that has the right viscoelastic properties at the temperature of interest for the application. The embedment procedure starting from solid sheets of damping or attenuation material also allows a great flexibility in embedding the damping or attenuation material at key locations in the panel structure. This can help to maximize the damping effectiveness in areas that experience the greatest need for it.

BRIEF DESCRIPTION OF THE DRAWINGS

FIG. 1 schematically illustrates a perspective view of a reinforcement element (1) in the form of a honeycomb core. A array of hollow columnar cells (3) having hexagonal cross-section (columnar cells) and being arranged essentially parallel to one another is formed by walls (2). Every hollow columnar cell (3) (columnar cell) comprises a cavity (4), a first open face (6) and an opposite second open face (7). Thus, the hollow columnar cells (3) resemble tubes with two open faces (6) and (7). The columnar cells have a longitudinal direction of extension (15).

FIG. 2 schematically illustrates a perspective view of an inventive embodiment of the reinforcement element (1) according to FIG. 1. The reinforcement element comprises coated columnar cells (3') each comprising a cavity (4') which is surrounded by cell walls (2'), wherein the inner surfaces of the cell walls (2') towards the cavities (4') of the coated columnar cells (3') are covered in their upper region towards the first open faces (6) with a layer of a damping or attenuation material (5).

DETAILED DESCRIPTION OF THE INVENTION

The reinforcement element according to the invention comprises cell walls which form an array of hollow columnar cells, wherein each columnar cell comprises a cavity which is surrounded by cell walls.

Preferably, the columnar cells are arranged essentially parallel to one another.

Preferably, the columnar cells have essentially the same size and dimensions.

Preferably, the columnar cells have a first open face and an opposite second open face.

Preferably, the columnar cells have an essentially hexagonal cross-section and form a honeycomb core.

Preferably, the reinforcement element according to the invention is for a panel structure. Preferably, the reinforcement element according to the invention is an essentially planar structure having a sheet-like form, or has a bent form, or has a curved form. Sheets, e.g. honeycomb cores, that are suitable for the manufacture of the reinforcement element according to the invention already comprising the array of columnar cells are commercially available.

The material from which the cell walls are made is not particularly limited. Preferably, the cell walls are made of metal or a resin impregnated fibrous material. Preferably, the cell walls are made of a resin impregnated fibrous material, wherein the fibrous material comprises paper, aramid fibers, carbon fibers, glass fibers, or mixtures thereof.

The thickness of the cell walls is not particularly limited. Preferably, the cell walls have a thickness within the range of from about 50 µm to about 500 µm. Preferably, the thickness of the cell walls is within the range of about 100±50 µm, 150±50 µm, 200±50 µm, 250±50 µm, 300±50 µm, 350±50 µm, 400±50 µm, 450±50 µm, 150±100 µm, 200±100 µm, 250±100 µm, 300±100 µm, 350±100 µm, or 400±100 µm. When the cell walls are coated with a layer of the damping or attenuation material, the thickness of the layer preferably does not contribute to the thickness of the cell walls.

Figure 4:
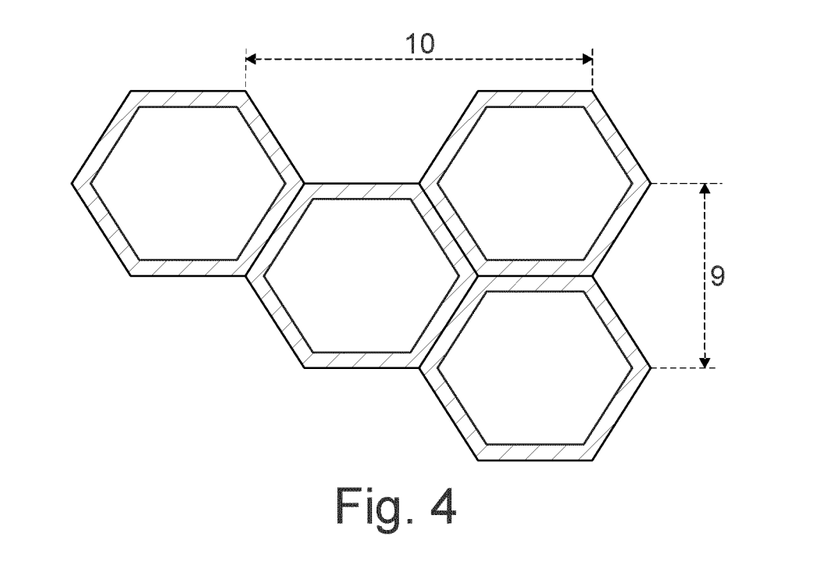
FIG. 4 schematically illustrates a top view of a coated columnar cell (3) according to FIG. 2 having a cell size (9) and a distance between cells (10).
Figure 5:
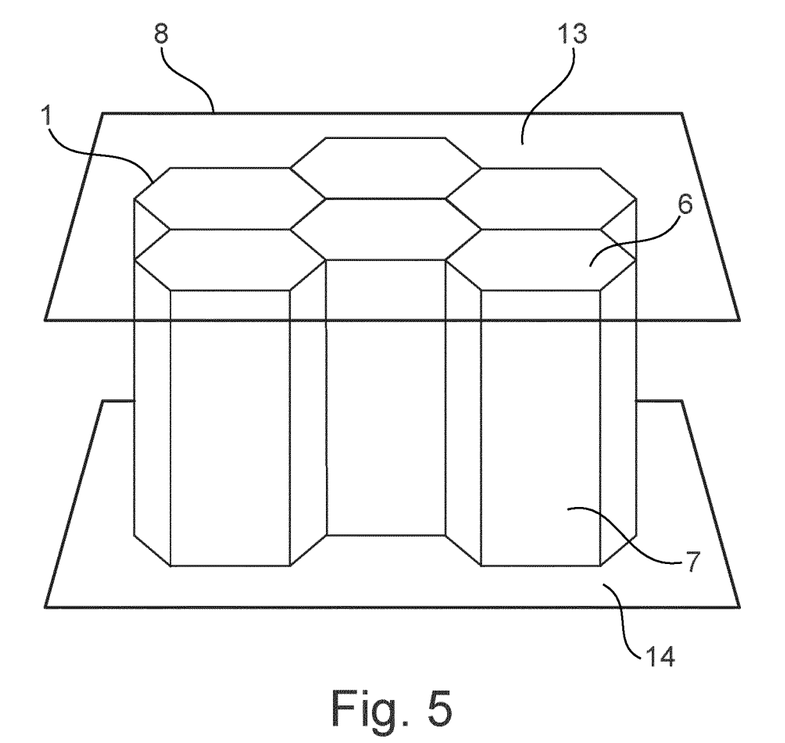
FIG. 5 schematically illustrates a perspective view of a panel structure (8) comprising a reinforcement element (1), wherein the first open faces (6) of the columnar cells (3) are closed by a first face sheet (13) and the opposite open faces (7) of the columnar cells (3) are closed by a second face sheet (14).

The size of the columnar cells is not particularly limited. Preferably, the size of the columnar cells as illustrated in FIG. 4 by reference numeral (9) is within the range of from about 2 mm to about 15 mm, preferably from about 2 mm to about 10 mm, more preferably from about 2 mm to about 5 mm. Preferably, the columnar cells of the reinforcement element all have essentially the same size.

The distance between the columnar cells not particularly limited either. Preferably, the distance between the columnar cells as illustrated in FIG. 4 by reference numeral (10) is within the range of from about 4 mm to about 30 mm, preferably from about 4 mm to about 10 mm. Preferably, the columnar cells of the reinforcement element all have essentially the same distance between one another.

Figure 3:
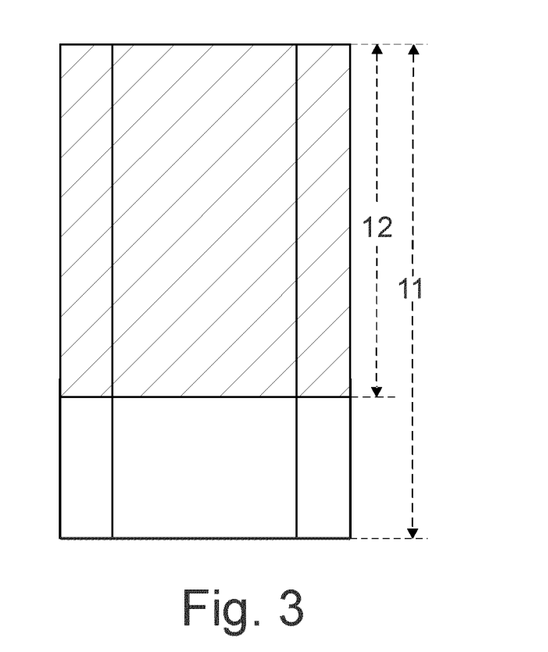
FIG. 3 schematically illustrates a side view of a coated columnar cell (3) according to FIG. 2 having a total height (11) and a covered height (12).

The total height of the columnar cells is not particularly limited either. Preferably, the total height of the columnar cells as illustrated in FIG. 3 by reference numeral (11) is within the range of from about 1 mm to about 55 mm, preferably from about 5 mm to about 15 mm.

In a preferred embodiment, in the absence of the damping or attenuation material, the array of hollow columnar cells (starting material) has a density within the range of from about 20 kg·m$^{-3}$ to about 500 kg·m$^{-3}$, preferably from about 29 kg·m$^3$ to about 200 kg·m$^3$.

In a preferred embodiment, in the absence of the damping or attenuation material, the array of hollow columnar cells (starting material) has a shear modulus according to ASTM C273 within the range of from about 1 MPa to about 800 MPa, preferably from about 20 MPa to about 400 MPa.

The reinforcement element according to the invention comprises at least one coated columnar cell comprising a cavity which is surrounded by cell walls, wherein an inner surface of a cell wall towards the cavity of the at least one coated columnar cell is at least partially covered with a layer of a damping or attenuation material.

Thus, for the purpose of the specification, it can be distinguished between coated columnar cells on the one hand and uncoated columnar cells on the other hand. While in a preferred embodiment all columnar cells of the reinforcement element are coated columnar cells, in another preferred embodiment only a portion of the columnar cells are coated columnar cells whereas the remainder are uncoated columnar cells. This may be advantageous where sound absorption, damping or attenuation properties are only desirable at certain locations such that the weight gain caused by the damping or attenuation material can be minimized thereby reducing the total weight of the reinforcement element.

In preferred embodiments, at least about 5% and up to about 100%, preferably at least about 10%, or at least about 20%, or at least about 30%, or at least about 40%, or at least about 50%, or at least about 60%, or at least about 70%, or at least about 80%, or at least about 90%, or about 100% of the total number of columnar cells contained in the reinforcement element are coated columnar cells, i.e. each comprise a cavity which is surrounded by cell walls, wherein the inner surface of the cell walls towards the cavity of each coated columnar cell is at least partially covered with a layer of a damping or attenuation material.

According to the invention, the damping or attenuation material typically does not completely fill the cavity of the coated columnar cell, but forms a layer, typically a thin layer, on the inner surface of the cell walls towards the cavities of the coated columnar cells.

It has been surprisingly found that by providing the damping or attenuation material in the form of a layer, the performance of the resultant reinforcement element can be improved compared to a reinforcement element wherein the damping or attenuation material fills the cavities e.g. as a foam.

Preferably, the layer of the damping or attenuation material has an average thickness within the range of from about 0.005 mm to about 10 mm, preferably from about to about 0.1 mm to about 10 mm, more preferably from about 0.5 mm to about 5 mm.

In preferred embodiments, the layer of the damping or attenuation material has an average thickness within the range of from 5 µm to 5000 µm. In preferred embodiments, the of the damping or attenuation material has an average thickness within the range of about 100±90 µm, 150±100 µm, 200±100 µm, 250±100 µm, 300±100 µm, 350±100 µm, 400±100 µm, 1000±100 µm, 500±100 µm, 550±100 µm, 600±100 µm, 650±100 µm, 700±100 µm, 750±100 µm, 800±100 µm, 850±100 µm, 900±100 µm, 950±100 µm, or 1000±100 µm.

In preferred embodiments, the layer of the damping or attenuation material has an average thickness within the range of about 1.0±0.5 mm, 1.5±0.5 mm, 2.0±0.5 mm, 2.5±0.5 mm, 3.0±0.5 mm, 3.5±0.5 mm, 4.0±0.5 mm, 4.5±0.5 mm, 5.0±0.5 mm, 5.5±0.5 mm, 6.0±0.5 mm, 6.5±0.5 mm, 7.0±0.5 mm, 7.5±0.5 mm, 8.0±0.5 mm, 8.5±0.5 mm, 9.0±0.5 mm, 9.5±0.5 mm, 1.5±1.0 mm, 2.0±1.0 mm, 2.5±1.0 mm, 3.0±1.0 mm, 3.5±1.0 mm, 4.0±1.0 mm, 4.5±1.0 mm, 5.0±1.0 mm, 5.5±1.0 mm, 6.0±1.0 mm, 6.5±1.0 mm, 7.0±1.0 mm, 7.5±1.0 mm, 8.0±1.0 mm, 8.5±1.0 mm, 9.0±1.0 mm, 2.5±2.0 mm, 3.0±2.0 mm, 3.5±2.0 mm, 4.0±2.0 mm, 4.5±2.0 mm, 5.0±2.0 mm, 5.5±2.0 mm, 6.0±2.0 mm, 6.5±2.0 mm, 7.0±2.0 mm, 7.5±2.0 mm, 8.0±2.0 mm, 3.5±3.0 mm, 4.0±3.0 mm, 4.5±3.0 mm, 5.0±3.0 mm, 5.5±3.0 mm, 6.0±3.0 mm, 6.5±3.0 mm, 7.0±3.0 mm, 4.5±4.0 mm, 5.0±4.0 mm, 5.5±4.0 mm, or 6.0±4.0 mm.

While it is contemplated that the inner surface of the cell wall towards the cavity of the at least one coated columnar cell is completely covered with a layer of the damping or attenuation material, it is also possible and preferred that the inner surface of the cell wall towards the cavity of the at least one coated columnar cell is only partially covered with a layer of the damping or attenuation material.

In preferred embodiments, at least about 5%, or at least about 10%, or at least about 20%, or at least about 30%, or at least about 40%, or at least about 50%, or at least about 60%, or at least about 70%, or at least about 80%, or at least about 90%, or up to about 100% of the inner surface of the cell wall towards the cavity of the at least one coated columnar cell is covered with a layer of the damping or attenuation material.

In preferred embodiments, not more than 95%, or not more than 90%, or not more than 85%, or not more than 80%, or not more than 75%, or not more than 70%, or not more than 65%, or not more than 60% of the inner surface of the cell wall towards the cavity of the at least one coated columnar cell is covered with a layer of the damping or attenuation material.

In a particularly preferred embodiment, about 30% to about 90% of the inner surface of the cell wall towards the cavity of the at least one coated columnar cell is covered with a layer of the damping or attenuation material.

Figure 1:
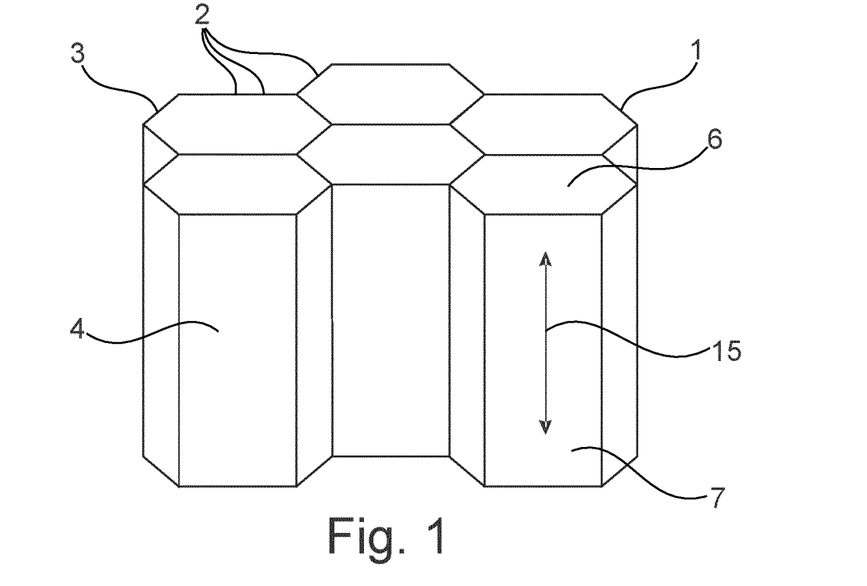
Figure 2:
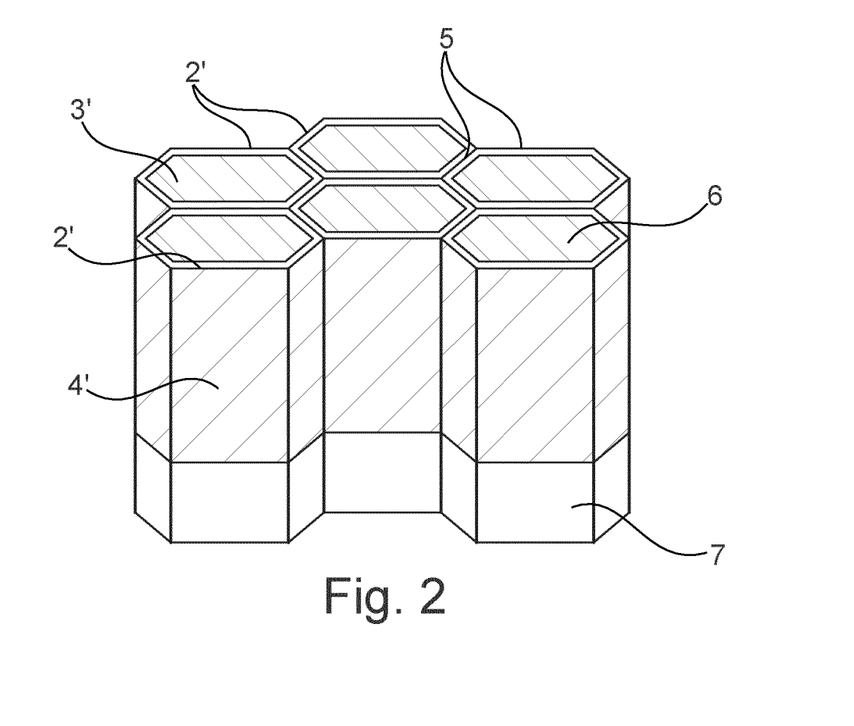

As illustrated e.g. in FIG. 2, the layer of the damping or attenuation material is preferably provided to the inner surface of the cell wall in a circumferential, collar-like arrangement.

In a preferred embodiment, at least one coated columnar cell has a total height as illustrated in FIG. 3 by reference numeral (11); wherein the inner surface of the cell wall towards the cavity of at least one coated columnar cell is partially covered with the layer of the damping or attenuation material to a covered height as illustrated in FIG. 3 by reference numeral (12); and wherein the relative ratio of the covered height to the total height is within the range of from about 0.05 to about 1.0, preferably from about 0.3 to about 0.9.

When the reinforcement element according to the invention comprises more than a single coated columnar cell, i.e. a plurality of coated columnar cells, said plurality of coated columnar cells preferably are coated with a layer of the damping or attenuation material in essentially the same manner, i.e. preferably at essentially the same layer thickness, at essentially the same area of coverage of the inner surfaces, and at essentially the same covered height, respectively. In other words, the individual coated columnar cells are preferably essentially identical to one another.

The layer of the damping or attenuation material at the inner surface of the cell walls towards the cavities of the coated columnar cells reduced the volume of the cavity compared to the volume of a cavity of the corresponding uncoated columnar cells.

In preferred embodiments, the cavity of the at least one coated columnar cell has a volume $V_C$ of at least about 3.0 mm$^3$, preferably at least about 20 mm$^3$, or at least about 50 mm$^3$.

In preferred embodiments, the cavity of the at least one coated columnar cell has a volume $V_C$ of not more than about 200 mm$^3$, preferably not more than about 100 mm$^3$, or not more than about 50 mm$^3$.

In a preferred embodiment, the cavity of the at least one coated columnar cell has a volume $V_C$; wherein the layer of the damping or attenuation material at least partially covering the inner surface of the cell wall towards the cavity of the at least one coated columnar cell has a volume $V_L$; and wherein the relative ratio of the volume $V_L$ to the volume $V_C$ is within the range of from about 0.01 to about 0.99, preferably from about 0.05 to about 0.95.

In preferred embodiments, the relative ratio of the volume $V_L$ to the volume $V_C$ is within the range of about 0.10±0.08, or 0.15±0.13, or 0.20±0.13, or 0.25±0.13, or 0.30±0.13, or 0.35±0.13, or 0.40±0.13, or 0.45±0.13, or 0.50±0.13, or 0.55±0.13, or 0.60±0.13, or 0.65±0.13, or 0.70±0.13, or 0.75±0.13, or 0.80±0.13, or 0.85±0.13, or 0.90±0.08, or 0.30±0.25, or 0.35±0.25, or 0.40±0.25, or 0.45±0.25, or 0.50±0.25, or 0.55±0.25, or 0.60±0.25, or 0.65±0.25, or 0.70±0.25.

In a preferred embodiment, a cavity of a columnar cell which is surrounded by cell walls, wherein the inner surface of the cell walls towards the cavity are not covered with a layer of a damping or attenuation material (uncoated columnar cell), has—or when the reinforcement element exclusively comprises coated columnar cells would have—a volume $V_0$; wherein the layer of the damping or attenuation material at least partially covering the inner surface of the cell wall towards the cavity of the at least one coated columnar cell has a volume $V_L$; and wherein the relative ratio of the volume $V_L$ to the volume $V_0$ is within the range of from about 0.01 to about 0.99, preferably from about 0.05 to about 0.95.

In preferred embodiments, the relative ratio of the volume $V_L$ to the volume $V_0$ is within the range of from about 0.10±0.08, or 0.15±0.13, or 0.20±0.13, or 0.25±0.13, or 0.30±0.13, or 0.35±0.13, or 0.40±0.13, or 0.45±0.13, or 0.50±0.13, or 0.55±0.13, or 0.60±0.13, or 0.65±0.13, or 0.70±0.13, or 0.75±0.13, or 0.80±0.13, or 0.85±0.13, or 0.90±0.08, or 0.30±0.25, or 0.35±0.25, or 0.40±0.25, or 0.45±0.25, or 0.50±0.25, or 0.55±0.25, or 0.60±0.25, or 0.65±0.25, or 0.70±0.25.

In a preferred embodiment, the reinforcement element according to any of the preceding clauses, wherein a cavity of a columnar cell which is surrounded by cell walls, wherein the inner surface of the cell walls towards the cavity are not covered with a layer of a damping or attenuation material, has—or when the reinforcement element exclusively comprises coated columnar cells would have—a volume $V_0$; wherein the cavity of the at least one coated columnar cell has a volume $V_C$; and wherein the relative ratio of the volume $V_C$ to the volume $V_0$ is within the range of from about 0.01 to about 0.99, preferably from about 0.05 to about 0.95.

In preferred embodiments, the relative ratio of the volume $V_C$ to the volume $V_0$ is within the range of from about 0.10±0.08, or 0.15±0.13, or 0.20±0.13, or 0.25±0.13, or 0.30±0.13, or 0.35±0.13, or 0.40±0.13, or 0.45±0.13, or 0.50±0.13, or 0.55±0.13, or 0.60±0.13, or 0.65±0.13, or 0.70±0.13, or 0.75±0.13, or 0.80±0.13, or 0.85±0.13, or 0.90±0.08, or 0.30±0.25, or 0.35±0.25, or 0.40±0.25, or 0.45±0.25, or 0.50±0.25, or 0.55±0.25, or 0.60±0.25, or 0.65±0.25, or 0.70±0.25.

In a preferred embodiment, a volume element $E_0$ of identical columnar cells which are surrounded by cell walls, wherein the inner surface of the cell walls towards the cavities are not covered with a layer of a damping or attenuation material, has—or when the reinforcement element exclusively comprises coated columnar cells would have—a density $\rho_0$; wherein a volume element $E_C$ of identical coated columnar cells has a density $\rho_C$; and wherein the relative difference $\rho_C - \rho_0$ is within the range of from about 5 kg·m$^{-3}$ to 1200 kg·m$^{-3}$.

In preferred embodiments, the relative difference $\rho_C - \rho_0$ is within the range of from about 5.0±4.0 kg·m$^3$, or 10±8.0 kg·m$^3$, or 15±8.0 kg·m$^{-3}$, or 20±8.0 kg·m$^{-3}$, or 25±8.0 kg·m$^{-3}$, or 30±20 kg·m$^3$, or 40±20 kg·m$^3$, or 50±20 kg·m$^3$, or 60±20 kg·m$^3$, or 70±20 kg·m$^{-3}$, or 80±20 kg·m$^3$, or 90±20 kg·m$^{-3}$, 100±80 kg·m$^{-3}$, or 150±80 kg·m$^3$, or 200±80 kg·m$^3$, or 250±80 kg·m$^3$, or 300±80 kg·m$^{-3}$, or 350±80 kg·m$^{-3}$, or 400±80 kg·m$^{-3}$, or 450±80 kg·m$^3$, or 500±80 kg·m$^3$, or 550±80 kg·m$^3$, or 600±80 kg·m$^{-3}$, or 650±80 kg·m$^{-3}$, or 700±80 kg·m$^{-3}$, or 750±80 kg·m$^3$, or 800±80 kg·m$^3$, or 850±80 kg·m$^3$, or 900±80 kg·m$^3$, or 950±80 kg·m$^3$, or 1000±80 kg·m$^3$, or 1050±80 kg·m$^3$, or 1100±80 kg·m$^{-3}$, or 1150±80 kg·m$^{-3}$, or 250±200 kg·m$^3$, or 300±200 kg·m$^{-3}$, or 350±200 kg·m$^3$, or 400±200 kg·m$^{-3}$, or 450±200 kg·m$^{-3}$, or 500±200 kg·m$^3$, or 550±200 kg·m$^3$, or 600±200 kg·m$^3$, or 650±200 kg·m$^{-3}$, or 700±200 kg·m$^3$.

In preferred embodiments, the reinforcement element according to the invention has an area weight within the range of from about 10 g·m$^2$ to about 25,000 g·m$^{-2}$, preferably from about 50 g·m$^2$ to about 6,000 g·m$^{-2}$. In preferred embodiments, the area weight is within the range of about 1000±800 g·m$^{-2}$, or 1500±800 g·m$^2$, or 2000±800 g·m$^2$, or 2500±800 g·m$^{-2}$, or 3000±800 g·m$^{-2}$, or 3500±800 g·m$^{-2}$, or 4000±800 g·m$^{-2}$, or 4500±800 g·m$^{-2}$, or 5000±800 g·m$^2$, or 5500±800 g·m$^2$, or 6000±800 g·m$^{-2}$, or 6500±800 g·m$^{-2}$, or 7000±800 g·m$^{-2}$, or 7500±800 g·m$^{-2}$, or 8000±800 g·m$^{-2}$, or 8500±800 g·m$^2$, or 9000±800 g·m$^2$, or 9500±800 g·m$^2$, or 2500±2000 g·m$^2$, or 3000±2000 g·m$^2$, or 3500±2000 g·m$^{-2}$, or 4000±2000 g·m$^{-2}$, or 4500±2000 g·m$^{-2}$, or 5000±2000 g·m$^2$, or 5500±2000 g·m$^2$, or 6000±2000 g·m$^{-2}$, or 6500±2000 g·m$^{-2}$, or 7000±2000 g·m$^{-2}$, or 7500±2000 g·m$^{-2}$, or 8000±2000 g·m$^2$.

In preferred embodiments, the reinforcement element according to the invention has a shear modulus according to ASTM C273 within the range of from about 1 MPa to about 1000 MPa, preferably from about 20 MPa to about 600 MPa. In preferred embodiments, the shear modulus is within the range of about 100±80 MPa, or 150±80 MPa, or 200±80 MPa, or 250±80 MPa, or 300±80 MPa, or 350±80 MPa, or 400±80 MPa, or 450±80 MPa, or 500±80 MPa, or 550±80 MPa, or 600±80 MPa, or 650±80 MPa, or 700±80 MPa, or 750±80 MPa, or 800±80 MPa, or 850±80 MPa, or 900±80 MPa, or 950±80 MPa, or 250±200 MPa, or 300±200 MPa, or 350±200 MPa, or 400±200 MPa, or 450±200 MPa, or 500±200 MPa, or 550±200 MPa, or 600±200 MPa, or 650±200 MPa, or 700±200 MPa, or 750±200 MPa, or 800±200 MPa.

In order to maximize composite loss factor to weight ratio of reinforcement structures such as honeycomb cores thereby improving acoustic performance of sandwich panels, the damping or attenuation material is preferably adhered to the reinforcement element, preferably honeycomb core, so that vibrational energy from the reinforcement element and panel structure can be transferred to the damping or attenuation material. This is preferably achieved by assuring proper adhesion of the material to the walls forming the columnar cells while maximizing surface interaction (depth of embedment, i.e. how deep the material penetrates down the cell wall) with the lowest amount of material possible.

A coating effect can make sure that the material is in excellent contact with the biggest surface of the walls forming the columnar cells. Moreover, the mechanism of coating by melting/sagging onto a vertical substrate does not impair the adhesion of the material to the walls forming the columnar cells.

The damping or attenuation material typically provides the reinforcement element or the panel structure including the reinforcement element or the article of manufacture including the panel structure with reinforcement, baffling, sealing, sound absorption, damping or attenuation, thermal insulation, combinations thereof or the like. Thus, the damping or attenuation material may exhibit relatively high strength to weight ratios, relatively high sound attenuation characteristics, combinations thereof or the like.

The damping or attenuation material is typically selected so as to be activatable under a desired condition. As used herein, activatable means that the material softens (e.g., melts), cures, expands, splutters or a combination thereof upon exposure to a condition or upon the combination of particular chemicals (e.g., 2-component materials). Typically, the material, upon activation, can wet, and preferably bond to adjacent surfaces (e.g., the surfaces provided by the walls, possibly also the first face sheet and the second face sheet).

In a preferred embodiment, typically for reinforcement, the damping or attenuation material has a post-cure glass transition temperature that is greater than any temperatures to which the material may be exposed while in its intended environment of use (e.g., in an airplane or automotive vehicle).

Exemplary post-cure glass transition temperatures of the damping or attenuation material may be greater than about 80° C. and more preferably greater than about 100° C. Other desired characteristics of the damping or attenuation material might include good adhesion retention and degradation resistance particularly in adverse environments such as highly variable temperature environments, high dynamic activity environments, combinations thereof or the like.

For particular embodiments (e.g., where damping or sound absorption is desired), the damping or attenuation material may stay in a softer or goopy state or it may become more solid particularly if it has a higher post-cure glass transition temperature. According to the embodiment, exemplary post-cure glass transition temperatures of the damping or attenuation material may be within the range of from about −100° C. to about +10° C. and more preferably from about −70° C. to about 0° C. Low modulus materials (e.g. rubbers) can be preferred as they provide excellent damping performance.

The damping or attenuation material may be a thermoplastic, a thermoset or a blend thereof. Preferably, the damping or attenuation material is a thermoset material that preferably adheres to the cell walls of the columnar cells. Adhesion of the damping or attenuation material to the cell walls significantly improves the sound absorption, damping or attenuation effect, preferably vibration damping effect. According to one embodiment, the damping or attenuation material is as an epoxy-containing material, an ethylene-containing polymer, an acetate or acrylate containing polymer, or a mixture thereof, which when compounded with appropriate ingredients (typically a blowing agent, a curing agent, and perhaps a filler), typically cures in a reliable and predictable manner upon the application of heat or another activation stimulus. Thus, according to one embodiment, an exemplary material may be a heat-activated and/or epoxy-based resin. Of course, the material may be activated by other conditions or stimuli.

From a chemical standpoint for a thermally-activated material, such damping or attenuation material is usually initially processed as a thermoplastic material before curing. After curing, the damping or attenuation material typically becomes a thermoset material that is fixed and incapable of any substantial flow. It is also contemplated that the damping or attenuation material may have a fiberglass or other fabric material integrated to one or more sides of the material and/or within the material.

The damping or attenuation material may be formed using a variety of processing techniques, machines and the like. Possible processing techniques for the preferred damping or attenuation materials include injection molding, blow molding, thermoforming, extrusion with a single or twin screw extruder or extrusion with a mini-applicator extruder. The damping or attenuation material may also be formed as a cast film.

Though preferred damping or attenuation materials are disclosed other suitable material may be used in conjunction with the present invention. The choice of the damping or attenuation material used will typically be dictated by performance requirements and economics of the specific application and requirements. Examples of other possible materials include, but are not limited to, polyolefins, copolymers and terpolymers with at least one monomer type an alpha-olefin, phenol/formaldehyde materials, phenoxy materials, polyurethanes typically with high glass transition temperatures (including polyureas), and mixtures or composites thereof (optionally including solid or porous metals).

In applications where the damping or attenuation material is a heat activated material, such as when a thermally melting, expanding, and/or curing material is employed, an important consideration involved with the selection and formulation of the material can be the temperature at which the damping or attenuation material activates, cures or both. In most applications, it is undesirable for the material to activate at room temperature or the ambient temperature in a production or assembly environment. Typically, it is desirable for the material to activate at higher processing temperatures. Typical activation temperature[s] is at least about 120° F. or less, more typically at least about 190° F., still more typically at least about 230° F. and even more typically at least about 265° F. and typically less than about 600° F. or greater, more typically less than about 450° F. and even more typically less than about 350° F. and still more typically less than about 275° F. Exposure to such temperatures typically occurs for a period of time that is at least about 10 minutes or less, more typically at least about 20 minutes and even more typically at least about 30 minutes and typically less than about 300 minutes or greater, more typically less than about 180 minutes and even more typically less than about 90 minutes.

Although the damping or attenuation material may be heat activated, it may be otherwise additionally or alternatively activated by other stimuli to cure, expand, bond, combinations thereof or the like. Without limitation, such material may be activated by alternative stimuli such as, pressure, moisture, chemicals, ultraviolet radiation, electron beam, induction, electromagnetic radiation or by other ambient conditions. As particular examples, the material may be a two-component adhesive material that expands, cures, adheres or a combination thereof upon adding one component to the other. Examples of first component/second component materials include epoxy/amine materials and epoxy/acid materials.

Preferably, the damping or attenuation material comprises a damping agent, preferably an elastomeric material such as a rubber.

Particles having a core-shell structure are a preferred component of the damping or attenuation material. Such particles generally have a core comprised of a polymeric material having elastomeric or rubbery properties (i.e., a glass transition temperature less than about 0° C., e.g., less than about −30° C.) surrounded by a shell comprised of a non-elastomeric polymeric material (i.e., a thermoplastic or thermoset/crosslinked polymer having a glass transition temperature greater than ambient temperatures, e.g., greater than about 50° C.). For example, the core may be comprised of, for example, a diene homopolymer or copolymer (for example, a homopolymer of butadiene or isoprene, a copolymer of butadiene or isoprene with one or more ethylenically unsaturated monomers such as vinyl aromatic monomers, (meth)acrylonitrile, (meth)acrylates, or the like) while the shell may be comprised of a polymer or copolymer of one or more monomers such as (meth)acrylates (e.g., methyl methacrylate), vinyl aromatic monomers (e.g., styrene), vinyl cyanides (e.g., acrylonitrile), unsaturated acids and anhydrides (e.g., acrylic acid), (meth)acrylamides, and the like having a suitably high glass transition temperature. The polymer or copolymer used in the shell may have acid groups that are crosslinked ionically through metal carboxylate formation (e.g., by forming salts of divalent metal cations). The shell polymer or copolymer could also be covalently crosslinked through the use of monomers having two or more double bonds per molecule. Other elastomeric polymers may also be used for the core, including polybutylacrylate or polysiloxane elastomer (e.g., polydimethylsiloxane, particularly crosslinked polydimethylsiloxane). The particle may be comprised of more than two layers (e.g., a central core of one elastomeric material may be surrounded by a second core of a different elastomeric material or the core may be surrounded by two shells of different composition or the particle may have the structure soft core, hard shell, soft shell, hard shell). Either the core or the shell or both the core and the shell may be crosslinked (e.g., ionically or covalently), as described, for example, in U.S. Pat. No. 5,686,509. The shell may be grafted onto the core. The polymer comprising the shell may bear one or more different types of functional groups (e.g., epoxy groups, carboxylic acid groups) that are capable of interacting with other components of the damping or attenuation material. In other embodiments, though, the shell is free of functional groups capable of reacting with other components present in the damping or attenuation material. Typically, the core will comprise from about 50 to about 95 percent by weight of the particles while the shell will comprise from about 5 to about 50 percent by weight of the particles.

Preferably, the elastomeric particles are relatively small in size. For example, the average particle size may be from about 30 nm to about 120 nm. In certain embodiments of the invention, the particles have an average diameter of less than about 80 nm. In other embodiments, the average particle size is less than about 100 nm. For example, the core-shell particles may have an average diameter within the range of from 50 to about 100 nm.

Elastomeric particles having a core-shell structure are available from several commercial sources. The following core-shell particles are suitable for use in the present invention, for example: the core-shell particles available in powder form from Wacker Chemie under the tradename GENIOPERL, including GENIOPERL P22, P23, P52 and P53, which are described by the supplier as having crosslinked polysiloxane cores, epoxy-functionalized polymethylmethacrylate shells, polysiloxane content of about 65 weight percent, softening points as measured by DSC/DMTA of about 120° C., and a primary particle size of about 100 nm, the core-shell rubber particles available from Rohm & Haas under the tradename PARALOID, in particular the PARALOID EXL 2600/3600 series of products, which are grafted polymers containing a polybutadiene core upon which is grafted a styrene/methylmethacrylate copolymer and having an average particle size of ca. 0.1 to about 0.3 microns; the core-shell rubber particles sold under the tradename DEGALAN by Roehm GmbH or Roehm America, Inc. (e.g., DEGALAN 4899F, which is reported to have a glass transition temperature of about 95° C.); the core-shell rubber particles sold by Nippon Zeon under the tradename F351; and the core-shell rubber particles sold by General Electric under the tradename BLENDEX.

The use of these core shell rubbers provides toughness to the damping or attenuation material, irrespective of the temperature or temperatures used to cure the damping or attenuation material. Many of the core-shell rubber structures available from Kaneka in the form of phase separated particles dispersed in epoxy resin are believed to have a core made from a copolymer of (meth)acrylate-butadiene-styrene, where butadiene is the primary component of the copolymer in the core. Other commercially available masterbatches of core-shell rubber particles dispersed in epoxy resins include GENIOPERL M23A (a dispersion of 30 wt.-% core-shell particles in an aromatic epoxy resin based on bisphenol A diglycidyl ether; the core-shell particles have an average diameter of ca. 100 nm and contain a crosslinked silicone elastomer core onto which an epoxy-functional acrylate copolymer has been grafted; the silicone elastomer core represents about 65 wt.-% of the core-shell particle), available from Wacker Chemie GmbH.

Typically, the damping or attenuation material may contain from 5 to 25 wt.-%, preferably from 8 to 20 wt.-%, elastomeric particles having a core-shell structure. Combinations of different core-shell particles may advantageously be used in the damping or attenuation material. The core-shell particles may differ, for example, in particle size, the glass transition temperatures of their respective cores and/or shells, the compositions of the polymers used in their respective cores and/or shells, the functionalization of their respective shells, and so forth.

Toughening agents are preferably included in the damping or attenuation material. Suitable toughening agents may be selected from a wide variety of substances, but generally speaking such materials are polymeric or oligomeric in character, and may have functional groups such as epoxy groups, carboxylic acid groups, amino groups and/or hydroxyl groups capable of reacting with the other components of the damping or attenuation material, when the damping or attenuation material is cured by heating.

The epoxy-based prepolymers obtained by reacting one or more amine-terminated polymers such as amine-terminated polyethers and amino silane-terminated polymers with one or more epoxy resins represent a particularly preferred class of toughening agents. The epoxy resins useful for such purpose may be selected from among the epoxy resins described hereinabove, with particular preference being given to the diglycidyl ethers of polyphenols such as bisphenol A and bisphenol F (for example, having epoxy equivalent weights of from about 150 to about 1000). Mixtures of solid and liquid epoxy resins may be suitably employed.

The preparation of such epoxy-based prepolymers from amine-terminated polyethers is described, for example, in U.S. Pat. Nos. 5,084,532 and 6,015,865. Generally speaking, it will often be desirable to adjust the ratio of amine-terminated polyether epoxy resin being reacted such that there is an excess of epoxy groups relative to amine groups such that the latter functional groups are completely reacted (i.e., the epoxy-based prepolymer contains essentially no free amine groups). Mixtures of di- and trifunctional amine-terminated polyethers may be used. Amine-terminated polyethers containing both oxyethylene and oxypropylene repeating units (e.g., copolymers of ethylene oxide and propylene oxide, with the copolymers having a block, capped or random structure) may also be utilized as the amino-terminated polyether. Preferably, the amino-terminated polyether contains at least two amine groups per molecule. Preferably, the amine groups are primary amine groups.

Other suitable toughening agents include amorphous polysulfones, i.e., those polymers that contain predominately ether and sulfone groups interspersed between arylene residues. Such polysulfones, sometimes called polyethersulfones, may be prepared by the processes taught in U.S. Pat. No. 4,175,175, and particularly U.S. Pat. No. 3,647,751, for example.

Polysulfones containing ether and alkylene groups in addition to sulfone groups are predominately amorphous, and are suitable candidates for the practice of the subject invention. Such polysulfones (polyethersulfones) have glass transition temperatures Tg, of greater than 150° C., preferably greater than 175° C., and most preferably in excess of 190° C. The Tg of a preferred KM 180 amine terminated polyether sulfone (manufactured by Cytec Industries Inc., Woodland Park N.J.) is approximately 200° C.

Other toughening agents or impact modifiers known in the epoxy adhesive art may be used together with or in place of the aforementioned prereacts derived by reaction of amine-terminated polymers or amino silane-terminated polymers with epoxy resins. Generally speaking, such toughening agents and impact modifiers are characterized by having glass transition temperatures ranging from −30° C. to 300° C. Examples of such toughening agents and impact modifiers include, but are not limited to: reaction products of epoxy-reactive copolymers of butadiene (especially epoxy-reactive copolymers of butadiene with relatively polar comonomers such as (meth)acrylonitrile, (meth)acrylic acid, or alkyl acrylates, e.g., carboxyl-terminated butadiene-nitrile rubbers. Other examples include polyimides such as Matrimid 9725 supplied by Huntsman, Polyetherimides such as Ultem supplied by GE and others.

Mixtures of different auxiliary impact modifiers/toughening agents may be used. The amount of auxiliary impact modifier/toughening agent in the damping or attenuation material may vary substantially but typically is from about 0.1 to about 20 wt.-%, e.g. from about 5 to about 15 wt.-%. In one embodiment, it is contemplated that the toughening agent is present from about 10% to about 15% by weight of the total.

In another embodiment, the damping or attenuation material includes a toughening agent chosen from carboxy-terminated acrylonitrile-butadiene copolymer, polyamides, polyimides, and amido-amides. The carboxy-terminated acrylonitrile-butadiene copolymer can include, for example, NIPOL 1472, whereas the polyamide can include, for example, nylon. Suitable polyimides are known to those of ordinary skill in the art and include, for example, those described in detail in U.S. Pat. No. 5,605,745. Particularly preferred are those polyimides which, because of the asymmetry of the dianhydride or diamine, particularly the latter, possess a lesser degree of crystallinity or are wholly amorphous. Polyimides based on BTDA and AATI are preferred.

Such polyimides are available commercially under the trademark MATRIMID™ 5218 from the Ciba-Geigy Corporation, and have an inherent viscosity of >0.62 dl/g when measured at 0.5 wt.-% concentration in N-methylpyrollidone at 25° C. The molecular weight of these most preferred polyimides is greater than 20,000 Daltons, preferably greater than 50,000 Daltons, and most preferably in the range of about 100,000 Daltons.

An epoxy elastomer adduct may be included in the damping or attenuation material to provide the ability to initiate plastic deformation. Various epoxy/elastomer adducts may be employed. The epoxy/elastomer hybrid or adduct may be included in an amount of up to about 50% by weight of the damping or attenuation material. The epoxy elastomer adduct is approximately at least about 5%, more typically at least about 7% and even more typically at least about 10% by weight of the formulation and more preferably about 12% to 40%. The elastomer-containing adduct may be a combination of two or more particular adducts and the adducts may be solid adducts, semi-solids, at a temperature of 23° C. or may also be combinations thereof. A solid adduct is preferred in one preferred embodiment the adduct is composed of substantially entirely (i.e., at least about 70%, 80%, 90% or more) of one or more adducts that are solid at a temperature of 23° C.

The adduct itself generally includes about 1:5 to 5:1 parts of epoxy to elastomer, and more preferably about 1:3 to 3:1 parts of epoxy to elastomer. More typically, the adduct includes at least about 10%, more typically at least about 20% and even more typically at least about 40% elastomer and also typically includes not greater than about 60%, although higher or lower percentages are possible. The elastomer compound suitable for the adduct may be a thermosetting elastomer, although not required. Exemplary elastomers include, without limitation, natural rubber, styrene-butadiene rubber, polyisoprene, polyisobutylene, polybutadiene, isoprene-butadiene copolymer, neoprene, nitrile rubber (e.g., a butyl nitrile, such as carboxy-terminated butyl nitrile), butyl rubber, polysulfide elastomer, acrylic elastomer, acrylonitrile elastomers, silicone rubber, polysiloxanes, polyester rubber, diisocyanate-linked condensation elastomer, EPDM (ethylene-propylene diene rubbers), chlorosulphonated polyethylene, fluorinated hydrocarbons and the like. In one embodiment, recycled tire rubber is employed. Examples of additional or alternative epoxy/elastomer or other adducts suitable for use in the present invention are disclosed in United States Patent Publication 2004/0204551.

The elastomer-containing adduct is included to modify structural properties of the damping or attenuation material such as strength, toughness, stiffness, flexural modulus, and the like, halogenated elastomers are particularly useful.

Preferably, the damping or attenuation material comprises a stiffener, preferably an epoxy resin.

Suitable epoxy resins are curable epoxy resins having a plurality of epoxy groups per molecule. In general, a large number of glycidyl ethers having at least about two epoxy groups per molecule are suitable as epoxy resins. The polyepoxides may be saturated, unsaturated, cyclic or acyclic, aliphatic, alicyclic, aromatic or heterocyclic polyepoxide compounds. Examples of suitable polyepoxides include the polyglycidyl ethers, which are prepared by reaction of epichlorohydrin or epibromohydrin with a polyphenol in the presence of alkali. Suitable polyphenols therefore are, for example, resorcinol, pyrocatechol, hydroquinone, bisphenol A (bis(4-hydroxyphenyl)-2,2-propane), bisphenol F (bis(4-hydroxyphenyl)methane), bisphenol S, bis(4-hydroxyphenyl)-1,1-isobutane, fluorene 4,4'-dihydroxybenzophenone, bis(4-hydroxyphenyl)-1,1-ethane, bisphenol Z (4,4'-Cyclohexylidenebisphenol), and 1,5-hydroxynaphthalene. In one embodiment, the epoxy resin includes EPON 828. Other suitable polyphenols which may be used as the basis for the polyglycidyl ethers are the novolac resin-type condensation products of phenol and formaldehyde or acetaldehyde which are usually liquid at ambient temperature.

Other suitable polyepoxides are the polyglycidyl ethers of polyalcohols, aminophenols or aromatic diamines. The bisphenol based epoxy resins that are liquid at room temperature generally have epoxy equivalent weights of from 150 to about 200. The epoxy resins that are solid at room temperature may also or alternatively be used and are likewise obtainable from polyphenols and epichlorohydrin and have melting point of from 45 to 130° C., preferably from 50 to 80° C. Typically, the damping or attenuation material may contain from about 25 to about 90 wt.-% (e.g., 25, 30, 35, 40, 45, 50, 55 wt.-%) of epoxy resin (unless otherwise stated, all concentrations set forth herein are expressed in terms of the weight percent of the component in question based on the damping or attenuation material as a whole). The resins may be obtained by the reaction of bisphenol A or bisphenol F and epichlorohydrin.

Where epoxy resins are used alone, they are preferably combined with suitable curing agents, and optionally other components selected from catalysts, rheology control agents, tackifiers, fillers, elastomeric toughening agents, reactive diluents, soluble thermoplastics and other additives well known to those skilled in the art.

Optionally the damping or attenuation material contains a curing agent, i.e. a cross-linker. By the term curing agent is meant a reactive component capable of either reacting with the polymer such as the epoxy functional group or polymerizing the epoxy functional group where an epoxy resin is used. Where the damping or attenuation material is to be cured at elevated temperature, it contains one or more curing agents (hardeners) capable of accomplishing cross-linking or curing of certain of the components when the material is heated to a temperature in excess of room temperature.

When used in one component systems, the curing agents should not be activated at ambient temperature to ensure that the damping or attenuation material is storage stable at room temperature. Alternatively, the damping or attenuation material may be prepared from two component systems that are readily combined with one another prior to application such that also curing agents may be contained that are activated at ambient temperature.

Thermally-activatable or latent hardeners that may be used in the damping or attenuation material of the present invention, include guanidines, substituted guanidines, substituted ureas, melamine resins, guanamine derivatives, blocked amines, aromatic amines and/or mixtures thereof. Examples of substituted guanidines are methylguanidine, dimethylguanidine, trimethylguanidine, tetramethylguanidine, methylisobiguanidine, dimethylisobiguanidine, tetramethylisobiguanidine, hexamethylisobiguanidine, heptamethylisobiguanidine and, more especially, cyanoguanidine (dicyandiamide). Representatives of suitable guanamine derivatives which may be mentioned are alkylated benzoguanamine resins, benzoguanamine resins or methoxymethylethoxy-methylbenzoguanamine. Solid, finely ground hardeners are preferred and dicyandiamide is especially suitable.

Therefore, the damping or attenuation material preferably comprises a cross-linker (curing agent) for the epoxy resin, preferably dicyandiamide.

Good storage stability of the damping or attenuation material is thereby ensured. The amount of curing agent utilized will depend upon a number of factors, including whether the curing agent acts as a catalyst or participates directly in the crosslinking of the damping or attenuation material, the concentration of epoxy groups and other reactive groups in the damping or attenuation material, the desired curing rate and so forth.

Generally, such curing agents have relatively low molecular weights and reactive functionalities which are phenolic, hydroxyl, amine, amide, or anhydride. Preferable curing agents are the monomeric and oligomeric amine functional polyarylenes wherein between the arylene groups are simple covalent bridges such as in the diaminodiphenyls, or connecting groups selected from the group consisting of alkylene of from 1-8 carbon atoms, ether, sulfone, ketone, carbonate, carboxylate, carboxamide and the like.

Preferably, the damping or attenuation material comprises a catalyst for the curing reaction (i.e. a curing agent accelerator), preferably urea or a urea derivative for example dimethyl urea. Curing agent and catalyst form a curing system.

In one preferred embodiment, the curing system comprises a mixture of dicyandiamide (DICY) as curing agent and a curing agent accelerator (catalyst) such as a bisurea and the damping or attenuation material is cured at about 120° C. In another preferred embodiment, the amine curing agent is a diaminodiphenylsulfone (DDS) and the curing temperature is about 180° C. In certain preferred embodiments, several curing agents may be combined with one another, e.g. a combination of DICY and DDS.

The amounts of curing agents and curing agent accelerators used can vary widely. Exemplary ranges for the curing agents when used and the optional curing agent accelerators present in the damping or attenuation material range from about 0.001% by weight to about 7% by weight of the damping or attenuation material.

Preferably, the damping or attenuation material comprises a viscosity modifier, preferably a hydrocarbon resin.

Fire resistance is preferably achieved by careful selection of fire retardant materials. The fact that the material is embedded into a part within individual cylinders (cells) closed by the first face sheet and the second face sheet adds complexity to the way the material is exposed to the flame. Hence the strategy for fire resistance shall be considered accordingly. A combination of gas phase action, radical inhibition and charring is preferably employed for fire retardancy.

Preferably, the damping or attenuation material comprises a flame retardant, preferably an organic phosphorous compound.

Depending upon the use to which the damping or attenuation material is to be put, the damping or attenuation material may be based on or contain polymers or copolymers, the damping or attenuation material may include one or more polymers or copolymers which may or may not contain functional groups, which can include a variety of different polymers, such as thermoplastics, elastomers, plastomers and combinations thereof or the like. For example, and without limitation, polymers that might be used include halogenated polymers, polycarbonates, polyketones, polyurethanes, polyesters, silanes, sulfones, allyls, olefins, styrenes, acrylates, polymethacrylates, epoxies, silicones, phenolics, rubbers, polyphenylene oxides, terephthalates, acetates (e.g., EVA), acrylates, methacrylates (e.g., ethylene methyl acrylate polymer) or mixtures thereof. Other potential polymeric materials may be or may include, without limitation, polyolefin (e.g., polyethylene, polypropylene) polystyrene, polyacrylate, poly(ethylene oxide), poly(ethyleneimine), polyester, polysiloxane, polyether, polyphosphazine, polyamide, polyimide, polyisobutylene, polyacrylonitrile, polyvinyl chloride), poly(methyl methacrylate), polyvinyl acetate), poly(vinylidene chloride), polytetrafluoroethylene, polyisoprene, polyacrylamide, polyacrylic acid.

When used, these polymers can comprise a small portion or a more substantial portion of the damping or attenuation material. When used, the one or more additional polymers preferably comprises about 0.1% to about 50%, more preferably about 1% to about 20% and even more preferably about 2% to about 10% by weight of the damping or attenuation material.

In certain embodiments, it may be desirable to include one or more thermoplastic polyethers and/or thermoplastic epoxy resins. When included, the one or more thermoplastic polyethers preferably comprise between about 1% and about 90% by weight of the damping or attenuation material, more preferably between about 3% and about 60% by weight and even more preferably between about 4% and about 25% by weight of the damping or attenuation material. As with the other materials, however, more or less thermoplastic polyether may be employed depending upon the intended use of the damping or attenuation material.

The thermoplastic polyethers typically include pendant hydroxyl moieties. The thermoplastic polyethers may also include aromatic ether/amine repeating units in their backbones. The thermoplastic polyethers preferably have a melt index between about 5 and about 100, more preferably between about 25 and about 75 and even more preferably between about 40 and about 60 grams per 10 minutes for samples weighing 2.16 Kg at a temperature of about 190° C. The thermoplastic polyethers may have higher or lower melt indices depending upon their intended application. Preferred thermoplastic polyethers include, without limitation, polyetheramines, poly(amino ethers), copolymers of monoethanolamine and diglycidyl ether, combinations thereof or the like.

Preferably, the thermoplastic polyethers are formed by reacting an amine with an average functionality of 2 or less (e.g., a difunctional amine) with a glycidyl ether (e.g., a diglycidyl ether). As used herein, the term difunctional amine refers to an amine with an average of two reactive groups (e.g., reactive hydrogens).

The thermoplastic polyether may be formed by reacting a primary amine, a bis(secondary) diamine, a cyclic diamine, a combination thereof or the like (e.g., monoethanolamine) with a diglycidyl ether or by reacting an amine with an epoxy-functionalized poly(alkylene oxide) to form a poly (amino ether). Alternatively, the thermoplastic polyether is prepared by reacting a difunctional amine with a diglycidyl ether or diepoxy-functionalized poly(alkylene oxide) under conditions sufficient to cause the amine moieties to react with the epoxy moieties to form a polymer backbone having amine linkages, ether linkages and pendant hydroxyl moieties. Optionally, the polymer may be treated with a monofunctional nucleophile which may or may not be a primary or secondary amine.

Additionally, it is contemplated that amines (e.g., cyclic amines) with one reactive group (e.g., one reactive hydrogen) may be employed for forming the thermoplastic polyether. Advantageously, such amines may assist in controlling the molecular weight of the thermoplastic ether formed. Examples of preferred thermoplastic polyethers and their methods of formation are disclosed in U.S. Pat. Nos. 5,275,853; 5,464,924 and 5,962,093.

A phenoxy resin may also be included in the damping or attenuation material. Phenoxy resins are high molecular weight thermoplastic condensation products of bisphenol A and epichloro-hydrin and their derivatives. Typically the phenoxy resins that may be employed are of the basic formula where n is typically from 30 to 100 preferably from 50 to 90. Modified phenoxy resins may also be used. Examples of phenoxy resins that may be used are the products marketed by Inchem Corp. Examples of suitable materials are the PKHB, PKHC, PKHH, PKHJ, PKHP-pellets and powder. Alternatively phenoxy/polyester hybrids and epoxy/phenoxy hybrids may be used. In order to enhance the production of the damping or attenuation material the phenoxy resin may be supplied to the other components as a solution.

Although not required, the damping or attenuation material may include one or more ethylene polymers or copolymers such as ethylene acrylate copolymers, ethylene vinyl acetate copolymers. Ethylene methacrylate and ethylene vinyl acetate are two preferred ethylene copolymers.

It may also be desirable to include a reactive polyethylene resin that is modified with one or more reactive groups such as glycidyl methacrylate or maleic anhydride. Examples of such polyethylene resins are sold under the tradename LOTADER™ (e.g., LOTADER AX 8900) and are commercially available from Arkema Group.

The damping or attenuation material may also include one or more finely divided fillers, including but not limited to particulate materials (e.g., powder), beads, microspheres such as Zeospheres available from Zeelan Industries, or the like. Preferably the filler includes a material that is generally non-reactive with the other components present in the damping or attenuation material however, the surfaces may be treated to improve adhesion or compatibility with the other materials. While the fillers may generally be present to take up space at a relatively low weight and cost, it is contemplated that the fillers may also impart properties such as strength and impact resistance to the damping or attenuation material.

Examples of fillers that may be used include silica, diatomaceous earth, glass, clay (e.g., including nanoclay), talc, pigments, colorants, glass beads or bubbles, glass, carbon or ceramic fibers, nylon or polyamide fibers (e.g., Kevlar), antioxidants, and the like. The clays that may be used as fillers may include clays from the kaolinite, illite, chloritem, smecitite or sepiolite groups, which may be calcined. Examples of suitable fillers include, without limitation, talc, vermiculite, pyrophyllite, sauconite, saponite, nontronite, montmorillonite or mixtures thereof. The clays may also include minor amounts of other ingredients such as carbonates, feldspars, micas and quartz. The fillers may also include ammonium chlorides such as dimethyl ammonium chloride and dimethyl benzyl ammonium chloride. Titanium dioxide might also be employed.

In one preferred embodiment, one or more mineral or stone type fillers such as calcium carbonate, sodium carbonate or the like may be used as fillers. In another preferred embodiment, silicate minerals such as mica may be used as fillers.

When employed, the fillers range from 10% or less to 70% or greater by weight of the damping or attenuation material. According to some embodiments, the damping or attenuation material may include from about 0% to about 3% by weight, and more preferably slightly less that 1% by weight clays or similar fillers. Powdered (e.g. about 0.01 to about 50, and more preferably about 1 to 25 micron mean particle diameter) mineral type filler can comprise between about 5% and 70% by weight, more preferably about 10% to about 50% by weight.

Other additives, agents or performance modifiers may also be included in the damping or attenuation material including but not limited to an antioxidant, a UV resistant agent, a heat stabilizer, a colorant, a processing aid, a lubricant, and a reinforcement. Liquid polysufides particularly epoxidized polysulfides may be used to improve the environmental exposure of the damping or attenuation material such as exposure to humidity and salt water.

Preferably, the damping or attenuation material has a Young modulus, preferably in accordance with EN ISO 527-1,-2, within the range of from about 1.0 MPa to 10 GPa, preferably from about 500 MPa to about 5 GPa. In preferred embodiments, the damping or attenuation material has a Young modulus, preferably in accordance with EN ISO 527-1,-2, within the range of about 1000±500 MPa, or 1500±500 MPa, or 2000±500 MPa, or 2500±500 MPa, or 3000±500 MPa, or 3500±500 MPa, or 4000±500 MPa, or 4500±500 MPa.

Preferably, the damping or attenuation material comprises an activated blowing agent, preferably an activated chemical blowing agent, preferably prior to activation having an activation temperature within the range of from about 100° C. to about 200° C., preferably from about 140° C. to about 160° C.

One or more blowing agents may be included in the damping or attenuation material. The blowing agents produce inert gasses when heated that convert the damping or attenuation material to an open and/or closed cellular structure. The blowing agents should not produce the gasses at room temperature to ensure that the damping or attenuation material is storage stable at room temperature.

The blowing agent may be a chemical blowing agent and may include one or more nitrogen containing groups such as amides, amines and the like. Examples of suitable blowing agents include azodicarbonamide, dinitrosopentamethylenetetramine, azodicarbonamide, dinitrosopentamethylene tetramine, 4,4-oxy-bis-(benzene-sulphonylhydrazide), trihydrazinotriazine and N,N-dimethyl-N,N-dinitrosoterephthalamide. An accelerator for the blowing agents may also be provided. Various accelerators may be used to lower the temperature at which the blowing agents form inert gasses. One preferred blowing agent accelerator is a metal salt, such as a metal oxide, for example zinc oxide. Other preferred accelerators include modified and unmodified thiazoles or imidazoles (ureas).

Another class of blowing agents are physical blowing agents such as the Expancel products marketed by Akzo-Nobel. Although these blowing agents are less preferred they consist of a polymeric particle with a volatile liquid in the center. As the temperature is increased, the polymer shell softens and the vaporization of the liquid inside the particle causes the polymer to expand. In this way, a foamed product is produced.

The amounts of blowing agent and blowing agent accelerators that are used can vary widely depending upon the type of cellular structure desired. Exemplary ranges for the total amount of blowing agents and blowing agent accelerators in the range from about 0.001% by weight to about 15% by weight.

In contrast to the prior art, the blowing agent according to the present invention does not primarily function to expand the damping or attenuation material to form a foam that fills the cavities of the columnar cells. On the contrary, the main purpose of the blowing agent is to assist the coating of the walls of the reinforcement element with the damping or attenuation material during manufacture. The thus applied damping or attenuation material is preferably not substantially foamed. For the purpose of the specification, not substantially foamed preferably means that the volume of the applied damping or attenuation material is not more than about 5% greater than the volume of the damping or attenuation material before it was applied.

Preferably, the damping or attenuation material is a homogeneous material.

Preferably, the damping or attenuation material does not comprise layers of different materials.

Preferably, the damping or attenuation material is the only material the inner surface of the cell wall is at least partially covered with.

Preferably, the damping or attenuation material is in direct contact with the inner surface of the cell wall.

Preferably, the damping or attenuation material comprises or essentially consists of a thermoset material.

Preferably, the damping or attenuation material adheres to the inner surface of the cell wall towards the cavity of the at least one coated columnar cell. Adhesion substantially improves the damping or attenuation effect of the material, e.g. damping of vibration.

Preferably, the T-peel resistance of the damping or attenuation material according to ASTM D1876 (1"×4", 0.01" bondline, CRS, 0.8 mm) is at least about 1.0 N/mm, or at least about 1.5 N/mm, or at least about 2.0 N/mm, or at least about 2.5 N/mm, or at least about 3.0 N/mm, or at least about 3.5 N/mm, or at least about 4.0 N/mm, or at least about 4.5 N/mm, or at least about 5.0 N/mm, or at least about 6.0 N/mm, or at least about 7.0 N/mm, or at least about 8.0 N/mm, or at least about 9.0 N/mm, or at least about 10 N/mm.

Preferably, the damping or attenuation material is an adhesive, preferably a cured adhesive (i.e. thermoset). Suitable adhesives are known to the skilled person and described e.g. in EP 1 789 250, EP 2 363 277, WO 2010/149353, and WO 2010/149354, which are incorporated herein by reference.

Another aspect of the invention relates to a panel structure for providing sound absorption, damping or attenuation comprising the reinforcement element according to the invention as described above. Preferably, the panel structure is a sandwich panel.

Preferably, the panel structure according to the invention comprises a first face sheet and optionally a second face sheet, wherein the reinforcement element extends between the first face sheet and the optionally present second face sheet.

The first face sheet and the second face sheet may be formed of a variety of materials. Exemplary materials include metals, polymeric materials (e.g., plastics, elastomers, thermoplastics, thermosets, combinations thereof or the like). Preferably, the first face sheet and/or the second face sheet is a fiber reinforced polymeric material, e.g. may be reinforced with minerals, fibrous materials (e.g., glass, carbon or nylon fibers), combinations thereof or the like.

Preferably, the first face sheet and/or the second face sheet independently of one another are formed at least partially of a plastic material, a fiber reinforced polymeric material, a prepreg, wood, a metal, or combinations thereof.

It should be understood that the first face sheet and the second face sheet of the present invention may be as thick or thin as needed or desired. For exemplary purposes, the thickness of the first face sheet and the second face sheet is typically at least about 0.05 mm but may be less, more typically at least about 0.5 mm and even more typically at least about 0.8 mm and is typically less than about 0.5 cm but may be greater, typically less than about 3 mm and even more typically less than about 1 mm.

Preferably, the first face sheet and/or the second face sheet independently of one another has an area weight within the range of from about 50 $g \cdot h^{-2}$ to about 10000 $g \cdot h^{-2}$, preferably from about 50 $g \cdot h^{-2}$ to about 5000 $g \cdot m^{-2}$, more preferably from about 250 $g \cdot m^{-2}$ to about 5000 $g \cdot m^{-2}$, still more preferably from about 250 $g \cdot m^{-2}$ to about 3000 $g \cdot m^{-2}$.

Preferably, the at least one coated columnar cell is closed with the first face sheet and the second face sheet.

Preferably, essentially all coated columnar cells are closed with the first face sheet and with the second face sheet.

Preferably, essentially all columnar cells as well as essentially all coated columnar cells are closed with the first face sheet and with the second face sheet.

In a preferred embodiment, the at least one coated columnar cell comprises a first open face that is closed with the first face sheet and an opposite second open face that is closed with the second face sheet, wherein an inner surface of the first face sheet towards the cavity of the at least one coated columnar cell closing the first open face is essentially uncovered with damping or attenuation material, and wherein an inner surface of the second face sheet towards the cavity of the at least one coated columnar cell closing the second open face is essentially uncovered with damping or attenuation material. Thus, in other words, the damping or attenuation material preferably at least covers a portion of the inner surface of the cell walls towards the cavity, but essentially not the inner surfaces of the face sheets closing the cavity. In this context "essentially not" means that damping or attenuation material may be present at the circumferential rim of the inner surfaces of the face sheets closing the cavity, but not across the entire inner surface thereof.

Preferably, the sound absorption, damping or attenuation effect according to the invention does not rely upon a sacrificial energy absorbing coating or resonation such as in a Helmholtz resonator. Thus, preferably neither the first face sheet nor the second face sheet is perforated.

Preferably, the panel structure according to the invention has a fire retardancy such that it passes the conditions of FAR23.853, and/or FAR23.856 (part 23=commuter aircrafts), and/or FAR25.853, and/or FAR25.856 (part 25=commercial aviation), FAR27.853 (part 27=small rotorcraft), and/or FAR29.853 (part 29=Transport rotorcraft), preferably of FAR25.853.a and FAR25.853.d, especially vertical burn, smoke density and toxicity requirements. It can also be applied in areas that are not subjected to fire requirements.

In a preferred embodiment, a comparative panel structure comprising the same array of hollow columnar cells, wherein each columnar cell comprises a cavity which is surrounded by cell walls, but wherein the reinforcement element comprises no coated columnar cell (i.e. which comprises no cavities which is surrounded by cell walls, wherein an inner surface of a cell wall towards the cavity of the at least one coated columnar cell is at least partially covered with a layer of a damping or attenuation material), has a damping loss factor $D_0$; wherein the panel structure comprising the reinforcement element according to the invention has a damping loss factor $D_C$, preferably in the region of the coated columnar cell(s); and wherein the relative ratio of $D_C$ to $D_0$ is within the range of from about 2 to about 10. In preferred embodiments, the relative ratio of $D_C$ to $D_0$ is at least about 2, or at least about 3, or at least about 4, or at least about 5, or at least about 6, or at least about 7, or at least about 8, or at least about 9.

It is contemplated that the panel structure may be employed in a variety of articles. Exemplary articles include household or industrial appliance (e.g., dishwashers, washing machines, dryers or the like), furniture, storage containers or the like. In one embodiment, the panel structure is employed in a transportation vehicle (e.g., an automotive vehicle, a boat, an airplane or the like). When used for a transportation vehicle, the panel structure has been found to be particularly useful as an interior panel structure (e.g., a panel exposed to an interior cabin portion of the vehicle). In one embodiment, the panel structure has been found particularly useful as an interior panel structure of an aerospace vehicle (e.g., an airplane). As such, the panel structure of the present invention is primarily discussed in relation to an airplane, however, the invention should not be so limited unless otherwise stated.

In a preferred embodiment, the panel structure according to the invention comprises a component of a transportation vehicle, preferably an aircraft.

Another aspect of the invention relates to a process for the production of a reinforcement element according to the invention as defined above, said process comprising the steps of
(i) providing a reinforcement element comprising cell walls forming an array of hollow columnar cells, wherein each columnar cell comprises a cavity which is surrounded by cell walls; and
(ii) at least partially covering an inner surface of a cell wall towards at least one cavity with a layer of a damping or attenuation material thereby providing at least one coated columnar cell.

In a preferred embodiment, step (ii) comprises the substeps of
(ii-a) heating the damping or attenuation material to a temperature above its melting temperature thereby providing a melt of damping or attenuation material;
(ii-b) dipping the reinforcement element provided in step (i) into the melt of damping or attenuation material thereby allowing the damping or attenuation material to flow inside the hollow columnar cells thereby at least partially covering an inner surface of a cell wall towards a cavity of the at least one coated columnar cell with a layer of a damping or attenuation material;
(ii-c) withdrawing the reinforcement element from the melt of damping or attenuation material; and
(ii-d) cooling the reinforcement element to a temperature below the melting temperature of the damping or attenuation material.

In another preferred embodiment (first variant) the damping or attenuation material is applied on top and is allowed to flow down, wherein step (ii) comprises the substeps of
(ii-A) providing the damping or attenuation material in the form of a sheet;
(ii-B) placing the array of hollow columnar cells in essentially vertical arrangement with respect to the longitudinal direction of extension of the columnar cells;
(ii-C) placing the sheet of the damping or attenuation material on top of the hollow columnar cells;
(ii-D) heating the damping or attenuation material to a temperature above its melting temperature thereby allowing the damping or attenuation material to flow inside the hollow columnar cells, preferably driven by gravitational force, thereby at least partially covering an inner surface of a cell wall towards a cavity of the at least one coated columnar cell with a layer of a damping or attenuation material; and
(ii-E) cooling the reinforcement element to a temperature below the melting temperature of the damping or attenuation material.

Preferably, the damping or attenuation material comprises a heat-activatable blowing agent and wherein in substep (ii-D) the damping or attenuation material is heated to a temperature above the activation temperature of the blowing agent thereby activating the blowing agent.

Preferably, the activation of the blowing agent promotes the flow of the damping or attenuation material inside the hollow columnar cells, preferably driven by gravitational force.

Preferably, in substep (ii-C) the sheet of the damping or attenuation material is placed on top of only some of the hollow columnar cells that are contained in the array of hollow columnar cells such that substep (ii-D) yields an array comprising uncoated columnar cells as well as coated columnar cells.

In a preferred embodiment, the damping or attenuation material is curable, preferably heat curable, and wherein the damping or attenuation material is cured, preferably heat cured, on the inner surface of a cell wall towards a cavity of the at least one coated columnar cell.

The reinforcement element of the present invention may be formed according to a variety of protocols. The damping or attenuation material may be applied directly to the walls of the reinforcement element. Thereafter, the damping or attenuation material may be activated to soften, cure, expand or a combination thereof to wet and adhere the damping or attenuation material to the walls of the reinforcement element. It is also contemplated that the damping or attenuation material may be preactivated to soften, cure, expand or a combination thereof and subsequently applied to the walls of the reinforcement element. Further, it is contemplated that one or more adhesives may be employed for attaching the walls of the reinforcement element and the material to each other.

Another aspect of the invention relates to a process for the production of a panel structure according to the invention as described above comprising the process for the production of a reinforcement element according to the invention as described above and the additional step of
(iii) applying a first face sheet and optionally a second face sheet to the reinforcement element, such that the reinforcement element extends between the first face sheet and the optionally present second face sheet.

It is contemplated that other additional or alternative techniques may be used to assist in the formation of the panel structure. Such techniques can include vacuum forming and baking, autoclaving and pressure, others or combinations thereof. Such techniques can assist in forming panels with contours. Heats and time period for these techniques can be the same as those discussing above or may be different depending upon the activatable material used.

As another addition or alternative to the previous embodiment, it is contemplated that the panel structure of the present invention may include a relatively high strength material throughout or within a region of the panel structure. Advantageously, such a material or region can assist in providing structural integrity to the panel structure, particularly at locations where components are attached to the panel structure.

Generally, for activated materials, the material of the high strength region is formed from an activatable or expandable material having lower expansion percentages than an activatable or expandable material forming the material of the lower strength region. Such relative expansion levels have been discussed above and apply here.

As another addition or alternative to the previous embodiments, it is contemplated that the panel structure of the present invention may include one or more relatively large openings (e.g., through-holes, cavities or the like) that are suitable for receipt of one or more components. For example, panel structures of the present invention may need to have openings suitable for receipt of components such as wiring, handles (e.g., closure panel handles), fasteners, trim, windows, signs, combinations thereof or other components.

Hence the assembly of the reinforcement element and the damping or attenuation material according to the invention is capable of being used in a wide range of composite part manufacturing cycles without internal process/material adjustments. Reinforcement structures such as honeycomb cores have virtually no shelf life and can be stored at room temperature. Using a cured material embedded in the core does not affect core typical storage conditions.

Adhesion mechanisms of sandwich panels are well known and rely on the ability of the resin in the face sheet (or using a specific adhesive film) to form a meniscus with the tip of the columnar cells. The bonding effectiveness of this meniscus depends on the ability of the resin to gather and bridge around the core edges by capillarity and pressure (as function of the resin viscosity=that will effect wettability).

The presence of the damping or attenuation material impairs this adhesion mechanism by leaving a small film of damping or attenuation material on the top of the core edges and potentially starving the resin by the presence of material in contact with the face sheet resin. This problem can be minimized by assuring that the damping or attenuation material melts and sags down the core wall, leaving the tip of the core available for bonding.

Another aspect of the invention relates to the use of a reinforcement element according to the invention or of a panel structure according to the invention for sound absorption, damping or attenuation, preferably for vibration damping, preferably in a transportation vehicle, more preferably for interior portions of transportation vehicles, still more preferably aerospace vehicles such as airplanes.

Preferred embodiments of the invention are summarized as Emb.-1 to Emb.-15 hereinafter: Emb.-1. A panel structure for providing sound absorption, damping or attenuation comprising (a) a first face sheet formed at least partially of a plastic material; (b) a second face sheet formed at least partially of a plastic material; (c) a honeycomb core comprising honeycomb walls; and (d) a damping or attenuation material; wherein the honeycomb core extends between the first face sheet and the second face sheet, such that the honeycomb core comprises an array of hollow columnar cells formed between the first face sheet, the second face sheet and the honeycomb walls; and wherein the damping or attenuation material forms a layer covering at least a portion of the inner surface of the first face sheet, the second face sheet and the honeycomb walls towards the inside of the hollow columnar cells. Emb.-2: The panel structure according to Emb.-1, wherein the layer covers at least about 50% of the area of the inner surface of the first face sheet, the second face sheet and the honeycomb walls towards the inside of the hollow columnar cells. Emb.-3: The panel structure according to Emb.-2, wherein the layer covers at least about 70% of the area of the inner surface of the first face sheet, the second face sheet and the honeycomb walls towards the inside of the hollow columnar cells. Emb.-4: The panel structure according to Emb.-3, wherein the layer covers at least about 90% of the area of the inner surface of the first face sheet, the second face sheet and the honeycomb walls towards the inside of the hollow columnar cells. Emb.-5: The panel structure according to any of the preceding Embs, wherein the hollow columnar cells are columnar in shape. Emb.-6: The panel structure according to any of the preceding Embs, wherein the hollow columnar cells are hexagonal in shape. Emb.-7: The panel structure according to any of the preceding Embs, wherein the layer has an average thickness within the range of from 5 μm to 5000 μm. Emb.-8: The panel structure according to any of the preceding Embs, wherein the first face sheet and/or the second face sheet is a fiber reinforced polymeric material. Emb.-9: The panel structure according to any of the preceding Embs, wherein the damping or attenuation material is an adhesive. Emb.-10: The panel structure according to Emb.-9, wherein the adhesive is cured. Emb.-11: The panel structure according to any of the preceding Embs, wherein the hollow columnar cells comprise hollow cavities each having a volume of at least about 1.0 $cm^3$. Emb.-12: The panel structure according to any of the preceding Embs, wherein the hollow columnar cells comprise hollow cavities each having a volume of at least about 2.5 $cm^3$. Emb.-13: The panel structure according to any of the preceding Embs, which comprises a component of a transportation vehicle. Emb.-14: The panel according to Emb.-13, wherein the vehicle is an aircraft. Emb.-15: A process for the production of a panel structure according to any of the preceding claims, comprising the steps of (i) providing a honeycomb core comprising honeycomb walls and extending between a first face sheet formed at least partially of a plastic material and a second face sheet formed at least partially of a plastic material, such that the honeycomb core comprises an array of hollow columnar cells formed between the first face sheet, the second face sheet and the honeycomb walls; (ii) providing a heat-activatable damping or attenuation material, which splatters upon heat-activation, at a location in the inside of the hollow columnar cells; and (iii) heating the damping or attenuation material to its activation temperature such that it splatters and forms a layer covering at least a portion of the inner surface of the first face sheet, the second face sheet and the honeycomb walls towards the inside of the hollow columnar cells.

LIST OF REFERENCE NUMERALS 1 reinforcement element
2 cell wall
3 columnar cell
4 cavity
5 layer of damping or attenuation material
6 first open face
7 opposite second open face
8 panel structure 9 cell size
10 distance between cells
11 total height of cells
12 covered height of cells
13 first face sheet
14 second face sheet
15 longitudinal direction of extension of the columnar cells

EXAMPLE

The following example further illustrates the invention but is not to be construed as limiting its scope.

Figure 6:
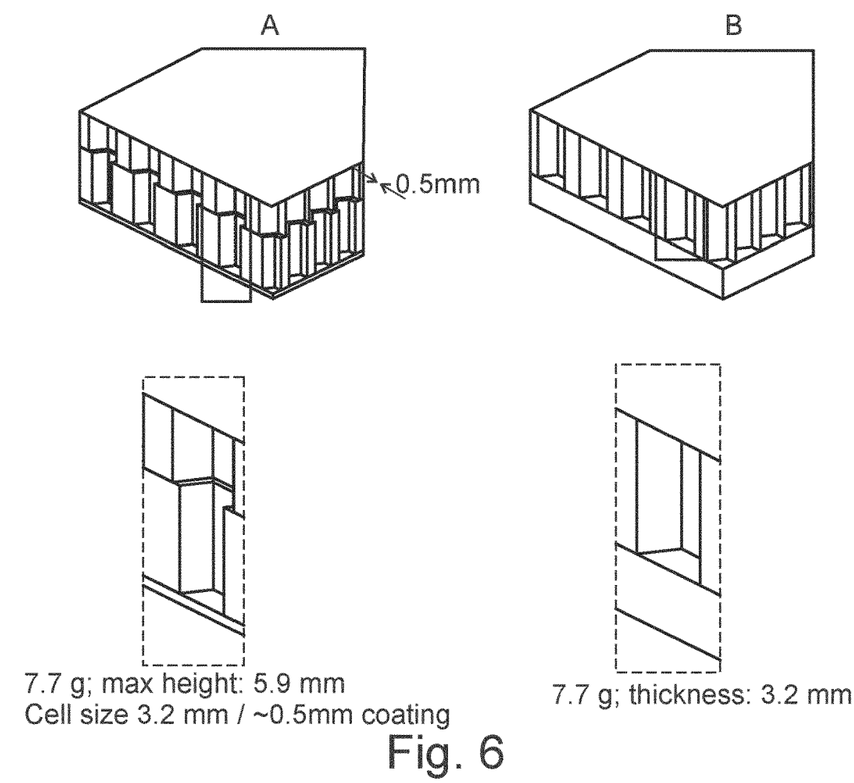
FIG. 6 illustrates two designs, inventive design 6A and comparative design 6B, for which the sound damping performance has been determined in a simulation calculation.

The sound damping performance of a comparative honeycomb core, wherein the columnar cells are filled with a foamed material (FIG. 6B), was compared with the sound damping performance of an inventive honeycomb core, wherein the interior walls of the columnar cells are coated with a layer of the same amount of material leaving the cavities of the columnar cells hollow (FIG. 6A).

Figure 7:
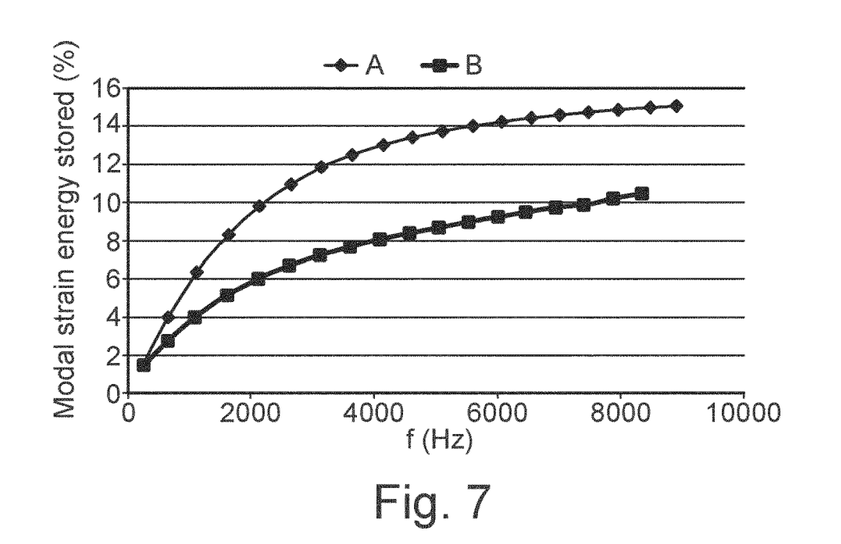
FIG. 7 shows the result of the calculation demonstrating that, while using the same amount of mass, the inventive design (A, ♦) is superior to the comparative design (B, ■).

The two treatments have the same mass, but in the case of the inventive treatment one can see an improvement of the performance which is illustrated in FIG. 7 by the capability to catch a higher part of the modal energy stored in the sandwich.

The invention claimed is:

1. A reinforcement element comprising cell walls forming an array of hollow columnar cells;
    wherein each columnar cell comprises a cavity which is surrounded by cell walls;
    wherein the reinforcement element comprises at least one coated columnar cell and at least one uncoated columnar cell, both comprising a cavity which is surrounded by cell walls, wherein an inner surface of a cell wall towards the cavity of the at least one coated columnar cell is at least partially covered with a layer of an epoxy-based thermoset damping or attenuation material; and
    wherein the damping or attenuation material does not completely fill the cavity of the coated columnar cell, but forms a layer on the inner surface of the cell wall towards the cavity of the coated columnar cell, the layer having an average thickness of 0.5 mm to 5 mm;
    wherein the layer is disposed on the inner surface of the cell wall in a circumferential collar-like arrangement and the epoxy-based thermoset damping or attenuation material contains 8 to 20 wt.-% elastomeric particles having a core-shell structure, further wherein a core of the core-shell structure having a core glass transition temperature of less than 0 degrees Celsius and a shell having a shell glass transition temperature of greater than 50 degrees Celsius; and
    wherein at least 50% of the total number of columnar cells contained in the reinforcement element are coated columnar cells and further wherein the cavity of the at least one uncoated columnar cell has a volume $V_O$ and the cavity of the at least one coated columnar cell has a volume $V_C$, and a relative ratio of $V_C$ to $V_O$ is 0.05 to 0.95.

2. The reinforcement element according to claim 1, wherein the relative ratio is 0.10 plus or minus 0.08.

3. The reinforcement element according to claim 1, wherein the cell walls are made of a resin impregnated fibrous material, wherein the fibrous material comprises carbon fibers, glass fibers, or mixtures thereof.

4. The reinforcement element according to claim 3, wherein at least 30% and up to 90% of the inner surface of the cell wall towards the cavity of the at least one coated columnar cell is covered with a layer of the damping or attenuation material.

5. The reinforcement element according to claim 3, wherein the at least one coated columnar cell has a total height; wherein the inner surface of the cell wall towards the cavity of the at least one coated columnar cell is partially covered with the layer of the damping or attenuation material to a covered height; and
    wherein the relative ratio of the covered height to the total height is within the range of from about 0.3 to about 0.9.

6. The reinforcement element according to claim 1, wherein the damping or attenuation material comprises a dicyandiamide cross-linker for the epoxy resin, a chemical blowing agent having an activation temperature within the range of from about 100° C. to about 160° C., and a hydrocarbon resin viscosity modifier.

7. A panel structure for providing sound absorption, damping or attenuation comprising the reinforcement element according to claim 1.

8. The panel structure according to claim 7, which comprises a first face sheet and optionally a second face sheet, wherein the reinforcement element extends between the first face sheet and the optionally present second face sheet.

* * * * *